US008246703B2

(12) United States Patent  (10) Patent No.: US 8,246,703 B2
Bordin  (45) Date of Patent: Aug. 21, 2012

(54) BUILDING AIR FILTRATION SYSTEM

(75) Inventor: Andrew Bordin, Woodbridge (CA)

(73) Assignee: Bordin Racing Limited, Woodbridge, ON (CA)

( * ) Notice: Subject to any disclaimer, the term of this patent is extended or adjusted under 35 U.S.C. 154(b) by 57 days.

(21) Appl. No.: 12/656,856

(22) Filed: Feb. 18, 2010

(65) Prior Publication Data
US 2011/0197766 A1 Aug. 18, 2011

(51) Int. Cl.
B01D 46/00 (2006.01)

(52) U.S. Cl. ....... 55/385.2; 454/195; 454/187; 454/181; 454/238; 454/239; 454/259

(58) Field of Classification Search ................ 55/385.2, 55/471, DIG. 18; 454/187, 191, 238, 239, 454/259
See application file for complete search history.

(56) References Cited

U.S. PATENT DOCUMENTS

| 357,022 | A | | 3/1971 | Felter | |
|---|---|---|---|---|---|
| 4,409,889 | A | * | 10/1983 | Burleson | 454/187 |
| 5,064,457 | A | * | 11/1991 | Weber | 55/385.2 |
| 5,074,894 | A | * | 12/1991 | Nelson | 96/224 |
| 5,099,751 | A | * | 3/1992 | Newman et al. | 454/238 |
| 6,383,241 | B1 | * | 5/2002 | Janus et al. | 55/385.2 |
| 6,749,499 | B1 | * | 6/2004 | Snyder | 454/289 |
| 7,156,897 | B2 | * | 1/2007 | Wen | 95/28 |
| 7,465,225 | B2 | * | 12/2008 | Ohmura et al. | 454/187 |
| 2002/0121196 | A1 | * | 9/2002 | Thakur et al. | 96/224 |
| 2006/0107635 | A1 | * | 5/2006 | Homan et al. | 55/385.2 |
| 2006/0213157 | A1 | * | 9/2006 | Kalous et al. | 55/385.2 |
| 2007/0068391 | A1 | * | 3/2007 | Wiener | 96/421 |
| 2010/0112926 | A1 | * | 5/2010 | Ozeki | 454/187 |
| 2010/0197214 | A1 | | 8/2010 | Geremia | |

FOREIGN PATENT DOCUMENTS

| CH | 693107 | 2/2003 |
|---|---|---|
| DE | 19707218 | 8/1998 |
| DE | 20007728 | 9/2000 |
| DE | 10214239 | 10/2003 |
| JP | 1036888 | 2/1989 |

* cited by examiner

Primary Examiner — Duane Smith
Assistant Examiner — Minh-Chau Pham

(57) ABSTRACT

An air filter system and an air filter therefor are provided for use in a building with first and second zones separated by a wall-door system having a wall with a door therein. Weatherstripping is mounted between side and upper edges of the door and a door frame in the wall and between the lower edge of the door and the threshold region of the floor to substantially seal against air flow between the door edges and the door frame and floor when the door is closed. An air flow permitting opening is provided in the wall-door system, sized to permit a controlled amount of airflow between the first and second zones when there is a pre-determined pressure differential between said zones. An air filter is mounted in such opening.

24 Claims, 7 Drawing Sheets

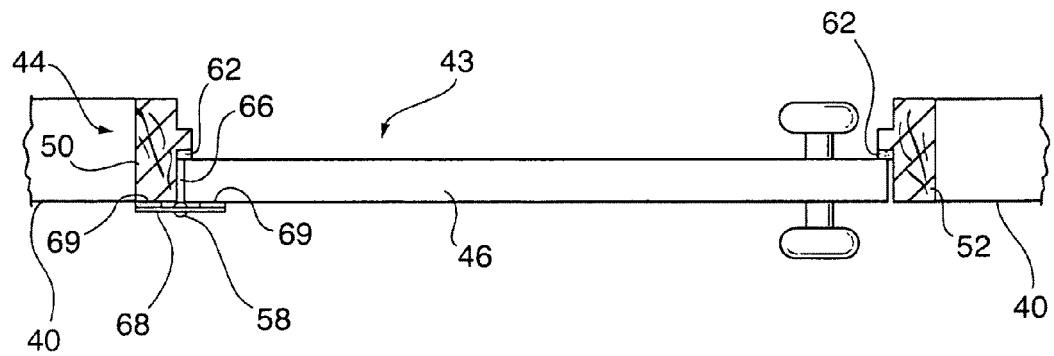
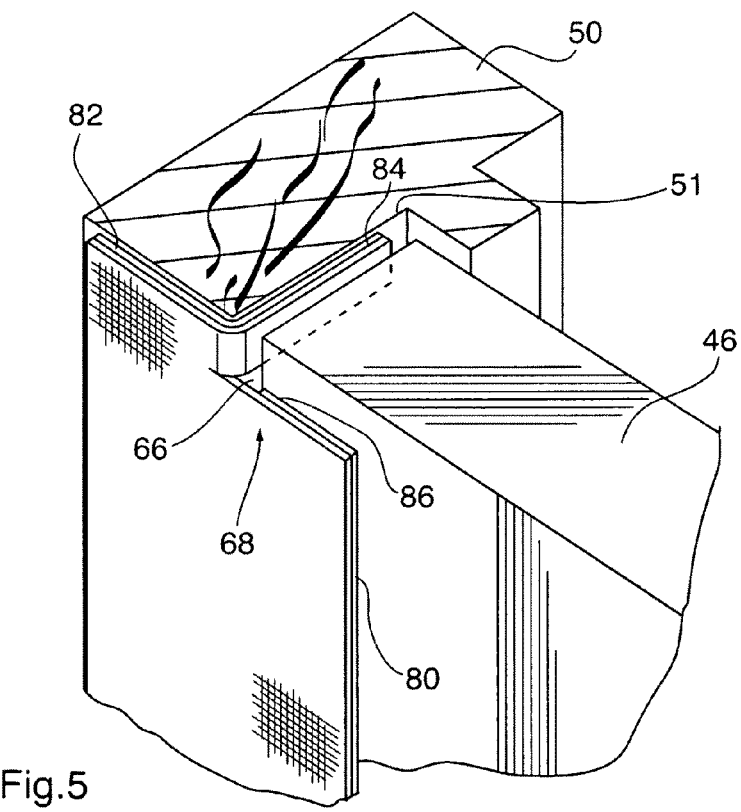

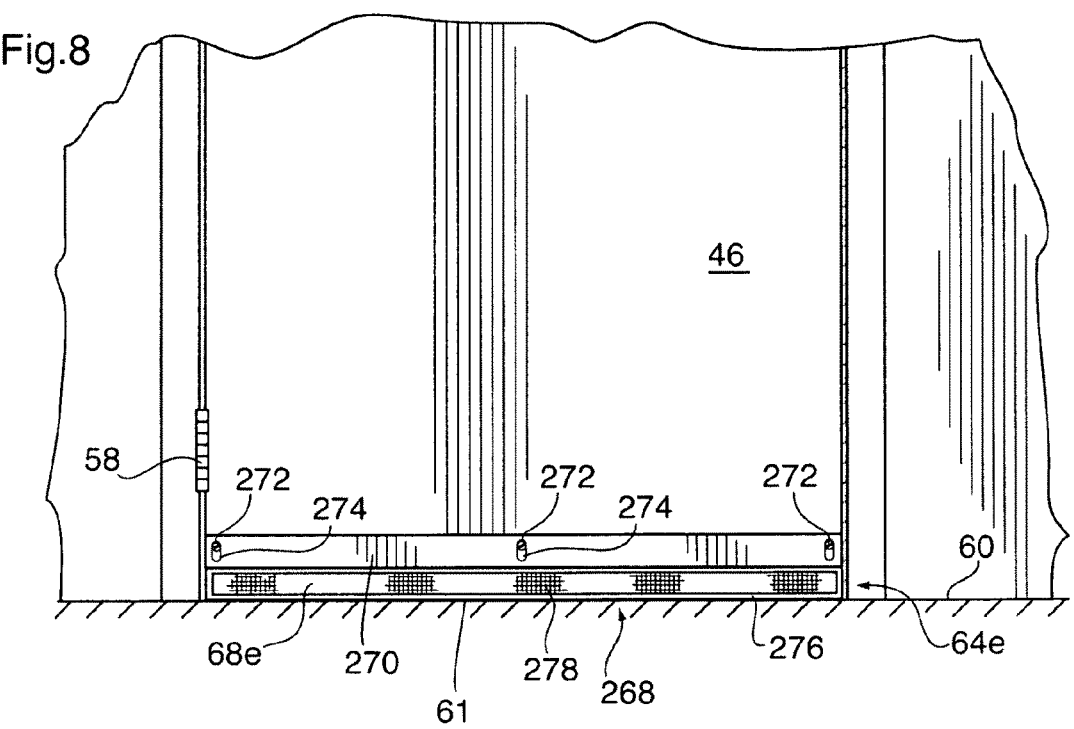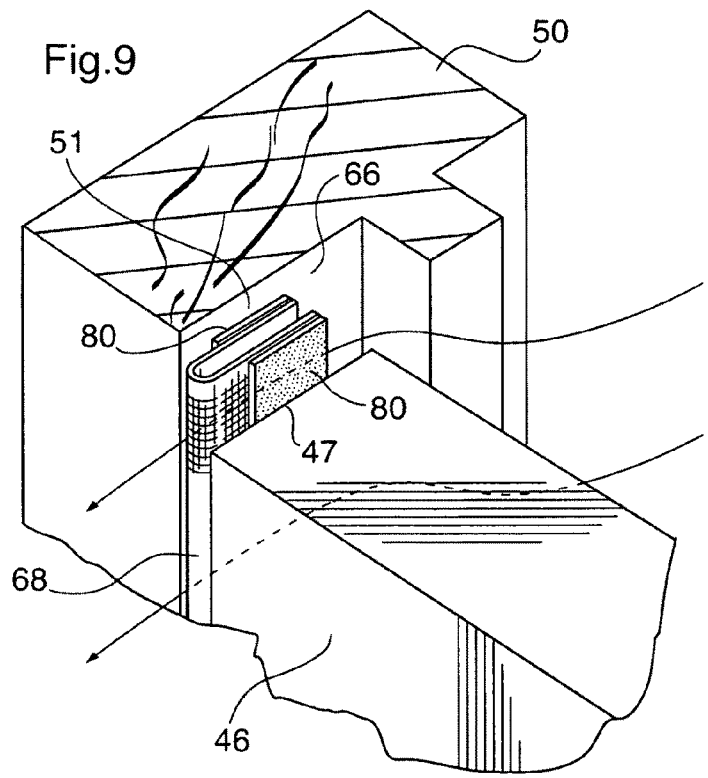

BUILDING AIR FILTRATION SYSTEM

FIELD OF THE INVENTION

This invention relates to an air filtration system for use in buildings in which air pressure gradients are maintained.

BACKGROUND OF THE INVENTION

It is known to subject large buildings, such as commercial office buildings or high rise hotel, apartment or condominium buildings, to positive air pressure relative to outside atmospheric pressure. An important reason for such pressurization is to reduce or eliminate air infiltration into a building through open or leaking doors or windows or otherwise through the building's exterior envelope. Such infiltering air, which bypasses the building's heating, ventilation and air conditioning or air handling ("HVAC") systems, can lead to indoor air quality problems, arising from undesirable contaminants and moisture carried by the infiltering air. Uncontrolled moisture in particular can be problematic, for example leading to damage of building components or to development of mold or mildew. Positive pressurization of the building reduces such problems.

Typically, to establish and maintain a positive pressure inside the building, air is blown by a fan into central interior portions of the building, thereby creating a high pressure zone relative to outside atmospheric pressure. As a result, an air pressure gradient is established across the building from the central portions of the building across the building envelope to the exterior. Air will tend to flow from zones of higher pressure to zones of lower pressure, following the gradient and at a rate dependent on the tightness of the building envelope, of any interior air barriers or air flow retarders and the presence and capacity of any return air system removing air from portions of the building.

In a typical office or high rise residential building, such as an apartment or a condominium building, the higher pressure air will be introduced into the common areas (e.g. hallways, corridors, elevator lobbies) which are usually located in the central core area of the building. The individual office or residential units or suites are usually clustered around the central core so as to afford each unit access to, or views of, the exterior.

The individual units are separated from the common areas and from each other by walls made (for obvious security, safety e.g. fire and smoke, noise, privacy and other reasons) of highly robust materials. For example, such walls may be made of concrete blocks, concrete panels or poured concrete. In most cases, such walls will be finished on both sides, for example by paint or by rigid sheet materials (e.g. taped and painted drywall or gypsum board). Typically, such wall structures comprise air flow barriers which are highly resistant or essentially impermeable to the flow of air therethrough.

Other common building materials which, if joints and seams are sealed, may also act as air barriers in a wall include sheathing materials such as plywood or oriented strand board (OSB), supported flexible barriers (e.g. polyethylene sheets), properly applied specialty air barrier compositions, rigid sheet insulation, glass blocks, sheets of glass and unperforated housewraps.

Some building materials, while resisting airflow therethrough, may nevertheless allow some air to pass. Examples may include some housewraps, felt papers and spray cellulose. Such materials may be known as air flow retarders.

Access from the common areas to the individual units is achieved through doorways in the wall. Door frames (consisting of two side jambs, a head jamb and possibly a sill or threshold) are installed in the doorway openings. Again, for security and other reasons, the door frames are typically made of highly robust materials, such as steel, and are solidly mounted to the wall.

The doors, mounted on hinges to the door frames, are also of made of highly robust materials, such as steel or heavy wood panels and possibly with cores of insulation. Such door paneling materials also typically are air flow barriers.

In buildings with the above structures, the pressurized air in the common areas, being unable to flow through the walls into the individual units, can only flow through the doorways. When the doors are closed, which typically would be most of the time, the air may only flow into the units around the edges of the doors, namely between the side edges of the door and the side jambs of the door frame, between the upper edge of the door and the head jamb of the door frame and between the lower edge of the door and the sill or threshold (if there is one) of the door frame or the floor itself (if there is no sill or threshold).

Although the structures described above are adequate to prevent or reduce problems of infiltration into the building of untreated outside air, they do not in any way address, let alone solve, problems associated with the flow of air along the pressure gradient from one zone of the building to another. In particular, they do not address the problems associated with air flow from the common areas into the individual units.

For example, regardless of the fact that dirt and other contaminants may not be brought into the building by means of air infiltration, the additional fact is that dirt and other contaminants are nevertheless present in, brought into or generated inside the building by various means. For example, residual dust and dirt may be present from the original building construction. In addition, dust and dirt will be brought into the building by people entering the building or may enter the building through open doors and windows. Dust and dirt may also be generated during building repairs or the innumerable activities of people inside the building. In addition, people and their pets are organic beings which constantly shed biological materials, such as dried skin and hair. All of these and other contaminants may be present in the form of airborne dust or other heavier particulates capable of being moved by flowing air.

Especially because the common areas of the building will typically have more traffic than individual units, a significant amount of dust and dirt can be present in the common areas. Some of that dust and dirt is entrained in the air in the common areas which then flows from the common areas into the units, as described above.

In this manner, contaminants are moved from one zone of the building to another by means of the air flow described above.

There is thus a need for a structure which will reduce or eliminate the movement of dirt, dust and other contaminants from a pressurized zone of a building into an adjacent zone of the building.

SUMMARY OF THE INVENTION

The present invention is directed, in one aspect, to an air filter system for a building having a first zone and a second zone which has a floor with a door threshold region, a wall-door system supported by the floor and incorporating an air flow barrier wall separating the first zone from the second zone, an air flow barrier door frame with at least two side jambs and a head jamb mounted in and sealed to the wall, an air flow barrier door generally sized to fit within the door frame, the door having two side edges and upper and lower edges and being hinged along one side edge to a side jamb of the door frame, weatherstripping mounted between the side and upper edges and the door frame and between the lower edge and the threshold region of the floor to substantially seal against air flow between the door edges and the door frame and floor when the door is closed, an air flow permitting opening in the wall-door system, sized to permit a controlled amount of airflow between the first zone and the second zone when there is a pre-determined pressure differential between said zones, and, an air filter mounted in such opening.

In another aspect, the present invention is directed to an air filter for filtering air flowing through a gap between a hinge edge of a door hinged to a side jamb of a door frame, the filter comprising a sheet of filter material removably and substantially sealably attachable along its edges, in a direction generally parallel to the gap, to the hinge edge of the door and to an adjacent portion of the side jamb.

In another aspect, the present invention is directed to a method of filtering air in a building having a first zone and a second zone separated by a wall-door system and a pressure differential therebetween, the system having a floor, an air flow barrier wall attached thereto and separating the first zone from the second zone, an air flow barrier door frame mounted in the wall, an air flow barrier door generally sized to fit within the door frame, the door being hinged along one side to a side jamb of the door frame, the method comprising: the steps of installing weatherstripping between the edges of the door and the door frame, except in a region along a hinge side of the door thereby to leave an opening when the door is closed; and, attaching a filter to the door and door frame over the opening and substantially sealing the edges of the filter to the door and door frame.

BRIEF DESCRIPTION OF THE DRAWINGS

Preferred embodiments of the present invention are illustrated in the attached drawings, in which:

FIG. 3 is a cross-section of the wall-door system of FIG. 2, along the line A-A thereof;

FIG. 5 is a close-up cut-away perspective detail showing the attachment of the filter of FIG. 4 to the wall-door system;

FIG. 8 is an elevation view of the lower portion of a wall-door system, showing the door in its closed position, according to yet a further alternate embodiment of the invention; and, FIG. 9 is a close-up view of a further alternate embodiment of the invention.

DETAILED DISCLOSURE

Figure 1:
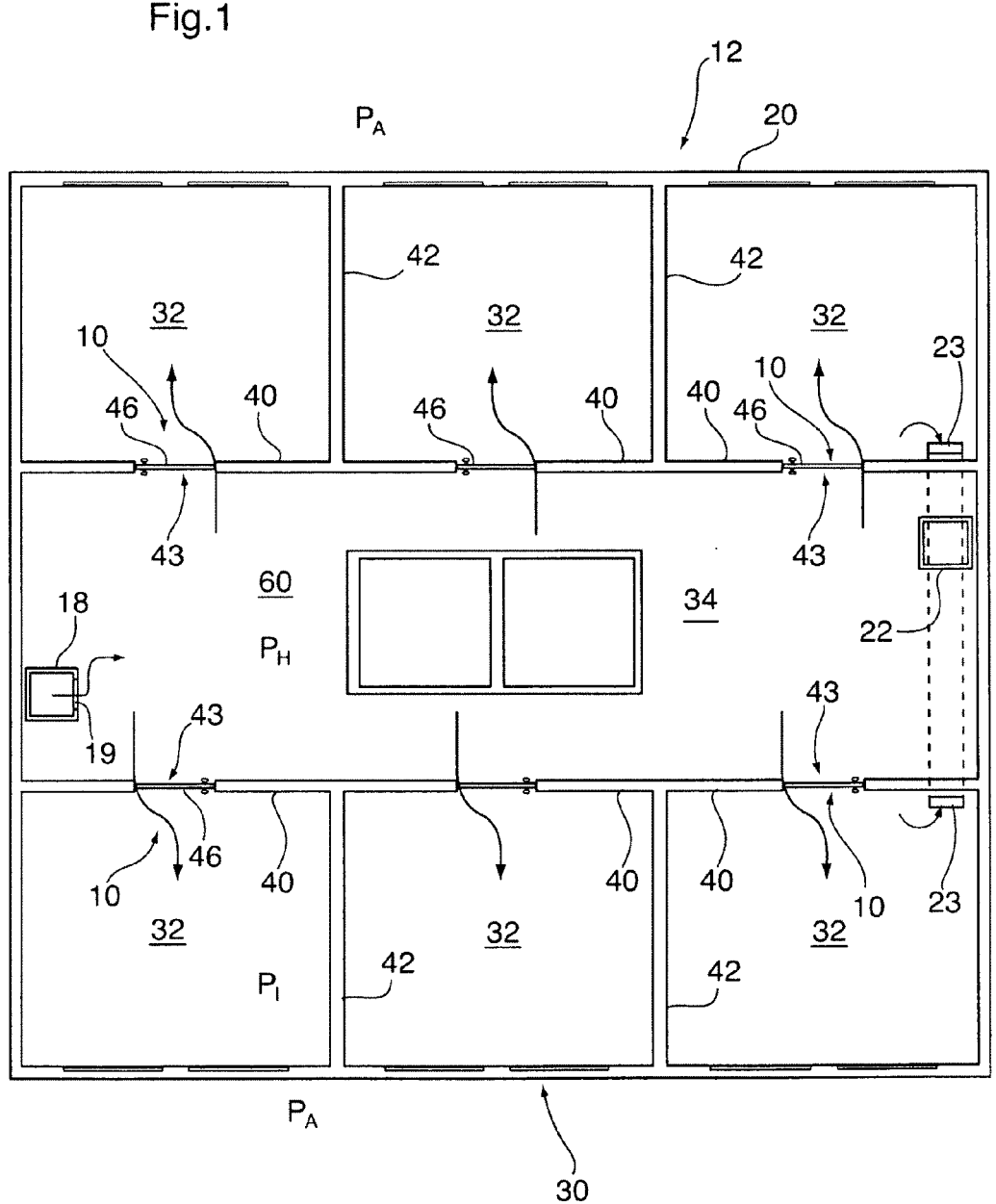
FIG. 1 is a plan view of a floor of a building which incorporates the invention.

Referring to FIG. 1, there is generally shown a representative floor 30 of a multi-level or high-rise building 12 in which the air filter system of the invention, generally shown as 10, is used in several units 32 of building 12. Building 12 may be a commercial or a residential building. Units 32 may be individual offices or residential units, such as apartment or condominium units or hotel suites.

Building 12 has a heating, ventilating and air conditioning (HVAC) system (not shown) to receive recirculated inside air, to take in some outside air and mix it with recirculated air, to condition the air (e.g. by filtering, heating or cooling to a desired temperature and humidifying or dehumidifying to a desired level) and to distribute it throughout the building by a supply duct system 18. For energy efficiency reasons, used air will typically be collected for recirculation and returned to the HVAC system through a return air duct system 22.

The HVAC system will include a blower (not shown) to supply air at a pressure $P_H$, somewhat higher than outside atmospheric pressure $P_A$, through inlet vents 19 to interior portions of building 12.

In a modern well-sealed building, the exterior building envelope 20 can be expected to be, through the use of suitable barrier materials (for example such as those mentioned above), reasonably impermeable to the flow of both air and water across or through the building envelope. Particularly in such well-sealed buildings, to allow for adequate ventilation, HVAC system 14 must take in an appropriate amount of fresh outside air and, so as to balance same, may have to exhaust a certain amount of used inside air. In such buildings, individual units 32 can be expected to be connected through outlet vents 23 to the return air duct system 22 and possibly also connected to the supply system 18 (connections not shown).

In older buildings, building envelope 20 may allow substantial airflow therethrough and, although such buildings may be relatively energy inefficient, there may be less concern about adequate ventilation.

As noted, an air filter system 10 according to the invention is shown in connection with several individual units 32 on floor 30. Floor 30 has a central common area 34, consisting of corridors, hallways, elevator lobby areas, common rooms and the like, which would be used by the various occupants and their visitors as they move to and from their particular units 32, for example en route to elevators, stairways, common rooms or other common spaces pertinent to the particular building.

The common area 34 is separated from the individual units 32 by a wall 40. Wall 40 is constructed of such materials and structural components so as to constitute an air barrier, namely so as to be substantially resistant to the flow air therethrough when subjected to a modest pressure differential on each side thereof. Typical materials may include concrete blocks, concrete panels, poured concrete and the like, faced with such surface treatments as may be necessary or desired, both on the interior side of wall 40 inside unit 32 or on the exterior side thereof in common area 34.

In some cases, particularly where security, fire, safety, noise or privacy concerns may be less, less robust or other types of wall construction may be adequate. For example, stud frame walls faced with drywall or plywood, if sealed at the joints, may act as an air barrier structure. Glass walls, made of sheet glass or glass blocks, with all joints sealed, may also act as an effective air barrier.

Walls 42 separate one unit 32 from neighboring units 32 and may be of similar construction to wall 40 but in any event preferably will constitute an air barrier between the units 32.

Walls 40 and 42 are supported by and on the physical floor 60. Preferably, walls 40 and 42 are sealingly attached to the floor 60 to ensure that air cannot flow under the walls, i.e. between the walls 40 or 42 and the floor 60. Similarly, preferably walls 40 and 42 are sealingly attached to ceiling structure 63 (shown in FIG. 2) to ensure that air cannot flow over the walls, i.e. between the walls 40 or 42 and the ceiling 63. Floor 60 and ceiling 63 preferably constitute air barriers.

Walls 40 have door openings 43 therein to allow access to a unit 32 from common area 34. The portion of floor 60 in the area of a door opening 43 constitutes a door threshold region 61 (shown in FIG. 2).

Figure 2:
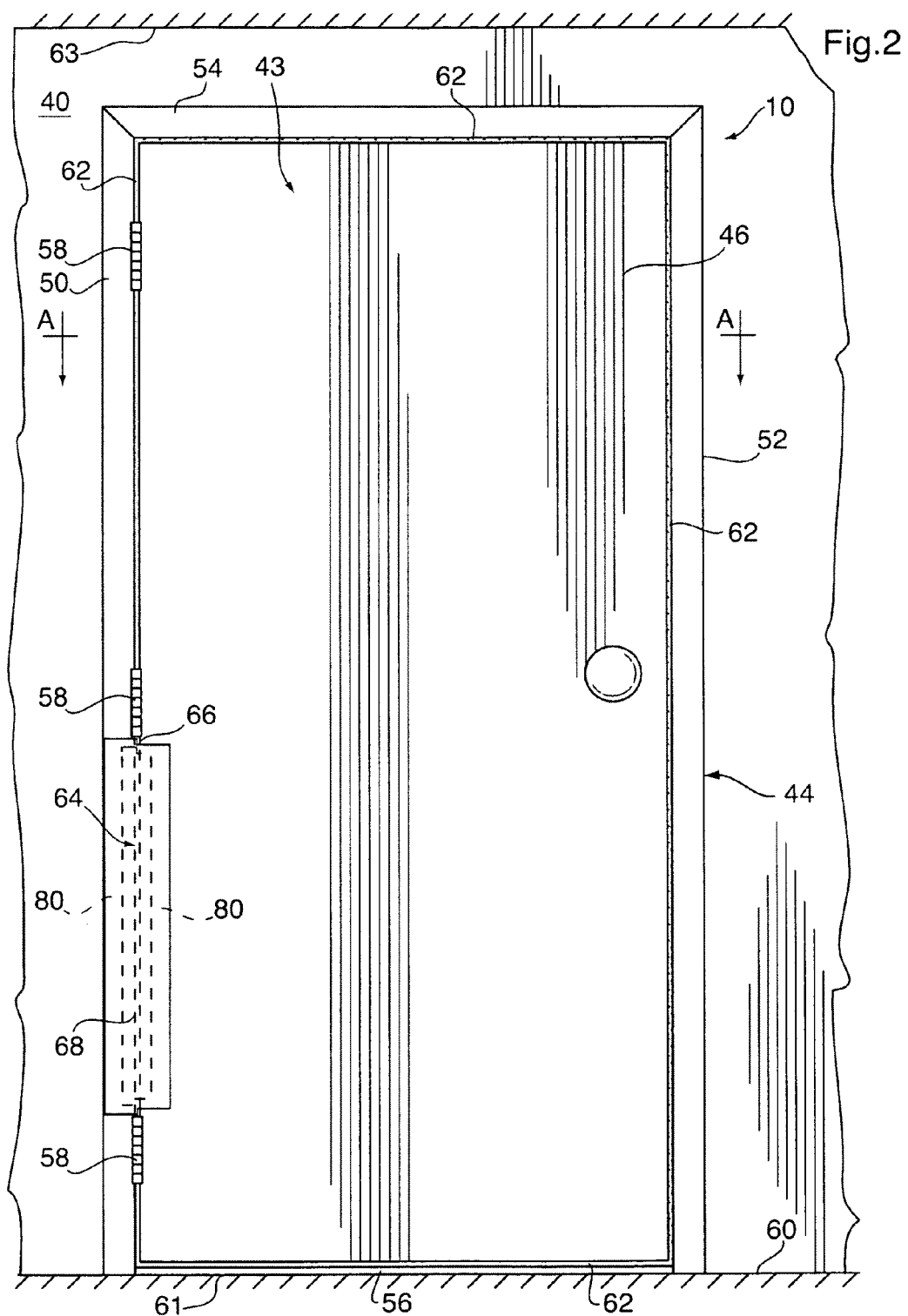
FIG. 2 is an elevation view of a wall-door system, showing the door in its closed position, according to the invention.

Referring to FIG. 2, a door frame 44 is attached to, or built into, a door opening 43. Preferably, door frame 44 is constructed from air barrier materials (e.g. steel or suitable wood) and in air barrier manner (e.g. sealed at all joints), so as to be substantially resistant to the flow air therethrough when subjected to a modest pressure differential on each side thereof. Door frame 44 is also preferably sealed to wall 40 to ensure that air cannot flow between wall 40 and door frame 44.

Door frame 44 at least comprises left and right side jambs 50 and 52, respectively, and head jamb 54. In addition, door frame 44 may have a sill or threshold 56 as the bottom member thereof, which will be located at or installed in the door threshold region 61 of floor 60. Preferably, any threshold 56 used will similarly be made of air barrier material (e.g. wood, steel or aluminum), so as to be substantially resistant to the flow air therethrough when subjected to a modest pressure differential on each side thereof, and sealed to the threshold region 61 of floor 60 to ensure that air cannot flow between threshold 56 and floor 60.

In some installations, there may be no sill or threshold, in which case the bottom of door 46 will be directly adjacent to the threshold region 61 of floor 60.

Door 46 has two side edges and upper and lower edges and is generally sized to fit within the door frame 44. Along one side edge, door 46 is attached by hinges 58 to one of the door jambs, for example as illustrated to left door jamb 50. Preferably, door 46 is constructed from air barrier materials (e.g. steel, wood, plastic or fiberglass panels), so as to be substantially resistant to the flow air therethrough when subjected to a modest pressure differential on each side thereof.

Although door openings 43, door frames 44 and doors 46 are shown as being of conventional generally rectangular shape, other shapes could be used.

Door sealing structures, such as weatherstripping 62, for sealing door 46 to door frame 44, are installed around the edges of door 46. As best illustrated in FIG. 3, weatherstripping 62 is mounted between the edges of door 46 and door frame 44, whereby to substantially seal against air flow around door 46 when the door is closed. The weatherstripping 62 may be of any suitable type and may be mounted to either door 46 or frame 44 or, for certain types of weatherstripping, some components thereof may be mounted to door 46 and others to door frame 44. Depending on whether the door frame 44 includes a sill or threshold 56 and its design, the type of weatherstripping 62 along the lower edge of door 46 may be different than the type of weatherstripping 62 used along the side and upper edges of door 46. If there is a sill or threshold, the weatherstripping 62 along the lower edge of door 46 will be of a type which can substantially seal against air flow between such lower edge and the sill. If there is no sill or threshold, the weatherstripping 62 along the lower edge of door 46 will be of a type which can substantially seal against air flow directly against the threshold region 61 of floor 60 when the door is closed.

The combination of wall 40, door frame 44, door 46 and weatherstripping 62 as described above establishes a wall-door system substantially resistant to the flow air therethrough when subjected to a modest pressure differential thereacross.

In accordance with the invention, an air flow permitting opening 64 is provided in such wall-door system to allow air to flow one side of the wall-door system to the other when the door is closed and there is a pressure differential thereacross. More specifically, as shown in FIG. 2, an air flow permitting opening 64 is provided in an area along an edge of door 46. In particular, opening 64 comprises a portion of the gap 66 between door 46 and side jamb 50 where weatherstripping 62 is purposely removed or not installed along a pre-determined length. Preferably opening 64 will be along the edge of door 46 where hinges 58 are located. For any given width of gap 66, the length of opening 64 may be selected to provide an overall area of opening 64 sized to permit a controlled amount of airflow therethrough when there is a pre-determined pressure differential thereacross. For example, the pre-determined pressure differential may be the difference between a specified pressure $P_H$ in the common area 34 and a specified pressure $P_I$ in the interior of unit 32. Of course, as atmospheric, mechanical and building conditions change, the pressure differential across opening 64 will also change with resulting changes in the amount of air flowing therethrough.

Opening 64 will preferably comprise a single area in which there is no weatherstripping 52, for example located between two hinges. However, in some embodiments, it may be desirable to have two or more sections of gap 66 in which there is no weatherstripping 62 (for example, above and below a central hinge 58), which in total would allow an airflow equivalent to a single larger opening.

Air filter 68 is mounted in, or substantially extends across or covers, opening 64. Air filter 68 is made up of material which is adapted to substantially permit the flow of air therethrough while trapping particles that exceed a certain minimum size. For example, hammock filter sheet material sold by 3M Company under the trademark FILTRETE and described by 3M Company as a "micro particle & airborne allergen reduction" filter, has been found to be suitable for the present application. In the embodiment of FIGS. 2 to 5, filter 68 is a generally rectangular sheet of filter material removably attached to side jamb 50 and the side edge of door 46 in a sealed manner so as not to allow significant amounts of air to flow around the edges of filter 68. Preferably, the manner of attaching filter 68 to jamb 50 and door 46 will allow for convenient removal and cleaning or replacement of a soiled or damaged filter. Strips 80 of suitable adhesive or double-sided adhesive tape along the length or substantially all of the length of filter 68 may be used for such purpose.

Figure 4:
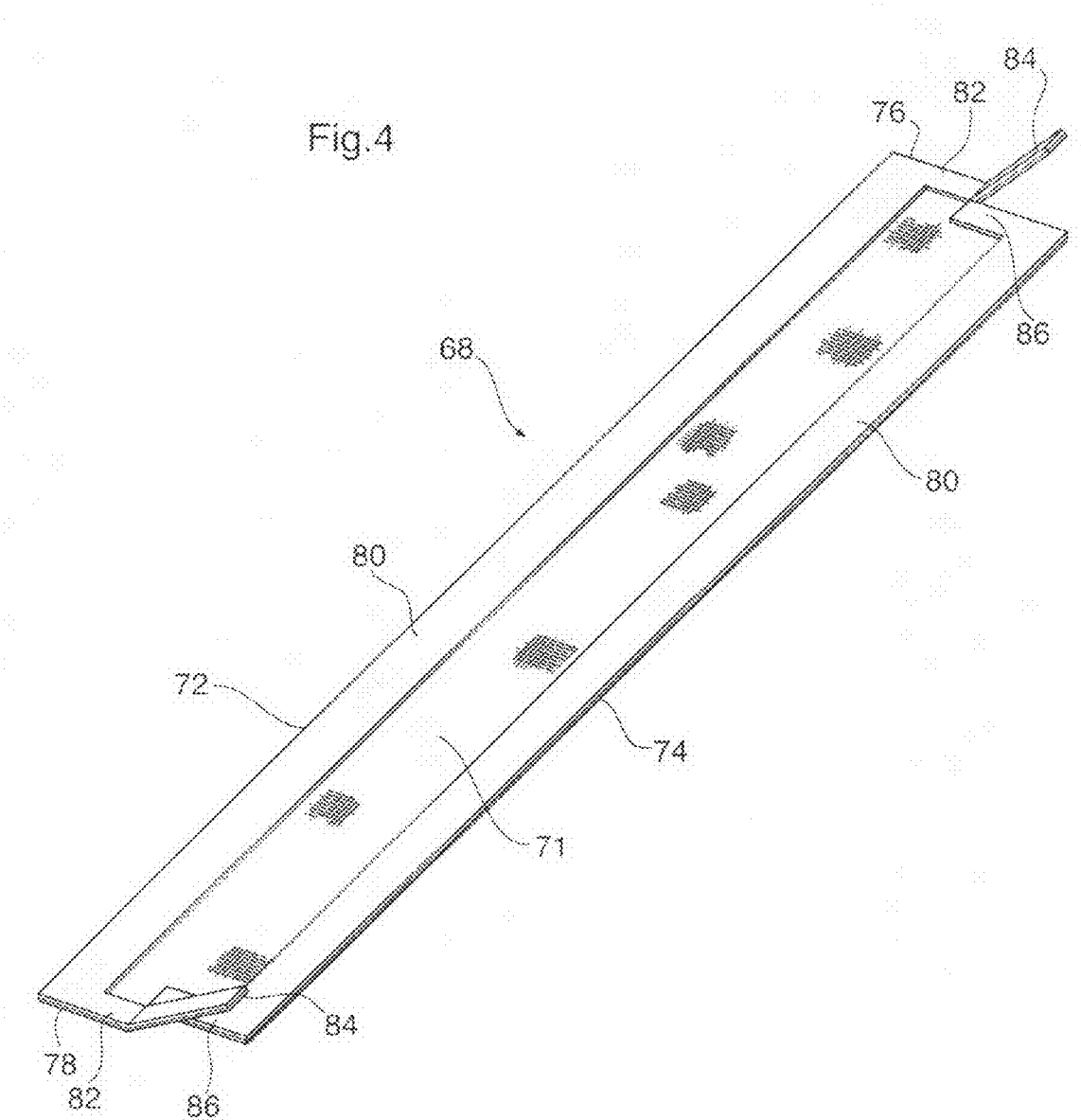
FIG. 4 is a perspective view of a preferred embodiment of a filter according to the invention.

Referring to FIGS. 4 and 5, filter 68 is shown in greater detail. Filter 68 comprises a generally rectangular sheet 71 of filter material with side edges 72 and 74 and upper and lower edges 76 and 78. Along each of edges 72 and 74, a strip 80 of adhesive or double-sided adhesive tape is applied along substantially the entire length of edges 72 and 74. In addition, adjacent upper and lower edges 76 and 78, additional cross-strips 82 of adhesive or double-sided adhesive tape may be applied.

The upper and lower edges 76 and 78 of filter 68 are cut to define attachment tabs 84, which will be bent, as explained below, out of the plane of filter 68. Tabs 84 are provided with adhesive or double-sided adhesive tape thereon. In view of the bending of attachment tabs 84, additional cross-strips 86 of adhesive or double-sided adhesive tape are attached to filter 68 near upper and lower edges 76 and 78. To ensure that cross-strips 82 and 86 and tabs 84 will provide a more robust attachment at the upper and lower sections of filter 68, the material of cross-strips 82 and 86 may comprise pieces of adhesive-backed neoprene or resilient weatherstripping material.

As shown in FIG. 5, filter 68 with attachment tabs 84 is attached to the front faces of door 46 and adjacent side jamb 50 by means of adhesive strips 80, 82 and 86. Upper and lower tabs 84 are wrapped around the edge of side jamb 50 essentially perpendicular to the front faces of door 46 and adjacent side jamb 50 and attached to a side face 51 of side jamb 50 by the adhesive of tabs 84. Filter 68 may also be reversed, so that tabs 84 are wrapped around a side edge of door 46.

In some embodiments, a filter 68 without attachment tabs 84 may be adequate for the purpose merely being held to door 46 and adjacent jamb 50 by adhesive strips 80.

Figure 6:
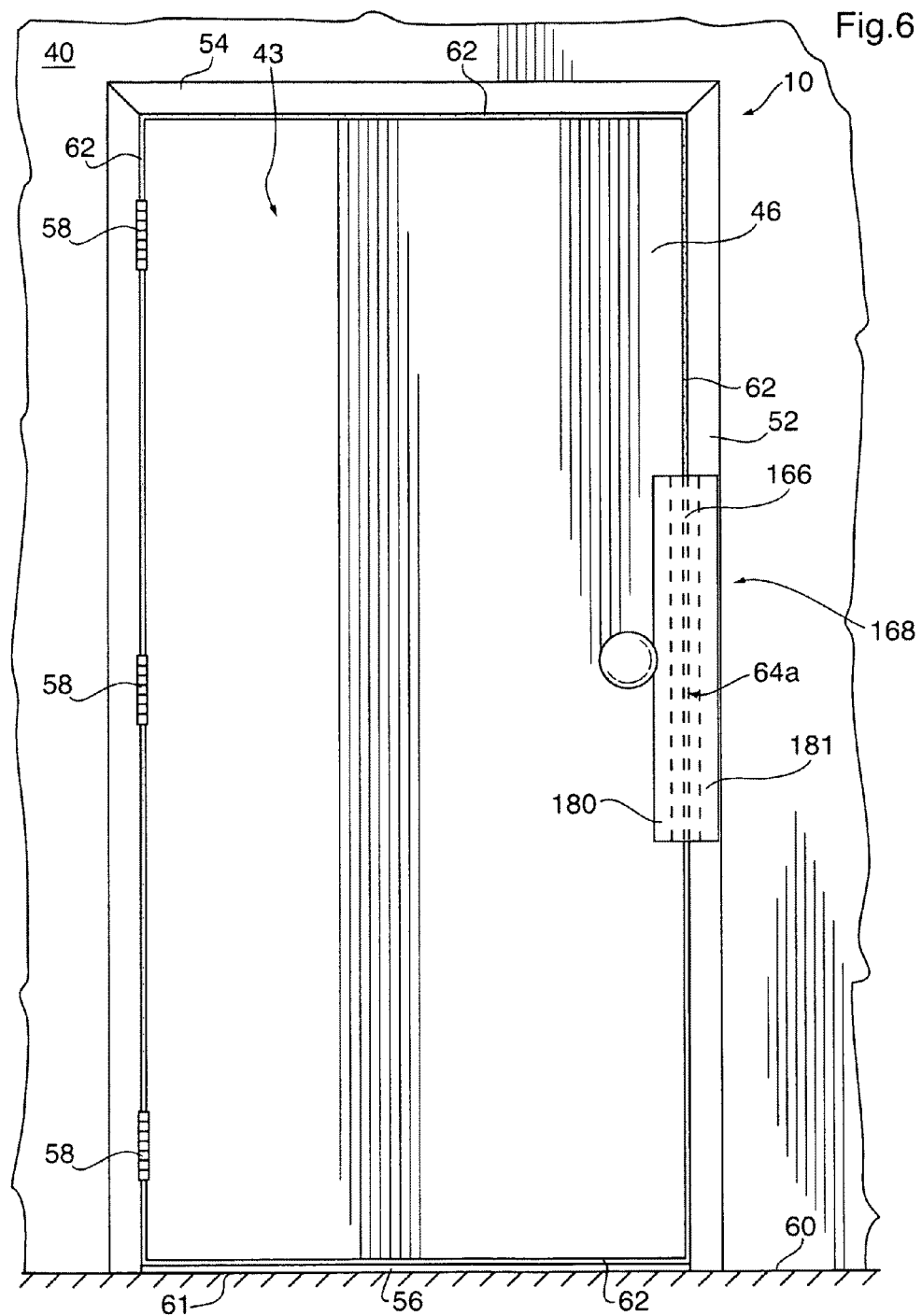
FIG. 6 is an elevation view of a wall-door system, showing the door in its closed position, according to an alternate embodiment of the invention.

Preferably, as noted above, opening 64 is located on the same side edge of door 46 as hinges 58. However, in other embodiments, openings in the weatherstripping could be provided at other suitable locations around the perimeter of door 46. In one such embodiment, as shown in FIG. 6, opening 64a is provided at gap 166 between door 46 and the non-hinge door jamb 52. In this case, opening 64a is covered by a piece of sheet of filter material 168 which is conveniently detachable on at least one side thereof to allow the opening and closing of the door 46. In this embodiment, filter 168 has a longitudinal strip 180 of adhesive or double-sided adhesive tape down one side thereof. In this case, the adhesive for strip 180 should bond relatively firmly to door 46 yet still be removable for cleaning or replacement of the filter. The other side of filter 168 is provided with a longitudinal strip 181 of a readily removable adhesive or other releasable attachment means, such as a hook-and-loop fastener for example as sold under the VELCRO brand.

In operation, when door 46 is closed and a pressure differential applied to the two sides of the wall-door system, filters 68 or 168, as the case may be, trap dust, dirt and other contaminants entrained in the air flowing through opening 64, thus preventing such dust, dirt and contaminants moving from a zone on one side of the wall-door system, such as a common area 34, to a zone on the other side, such as the interior of a unit 32.

Figure 7:
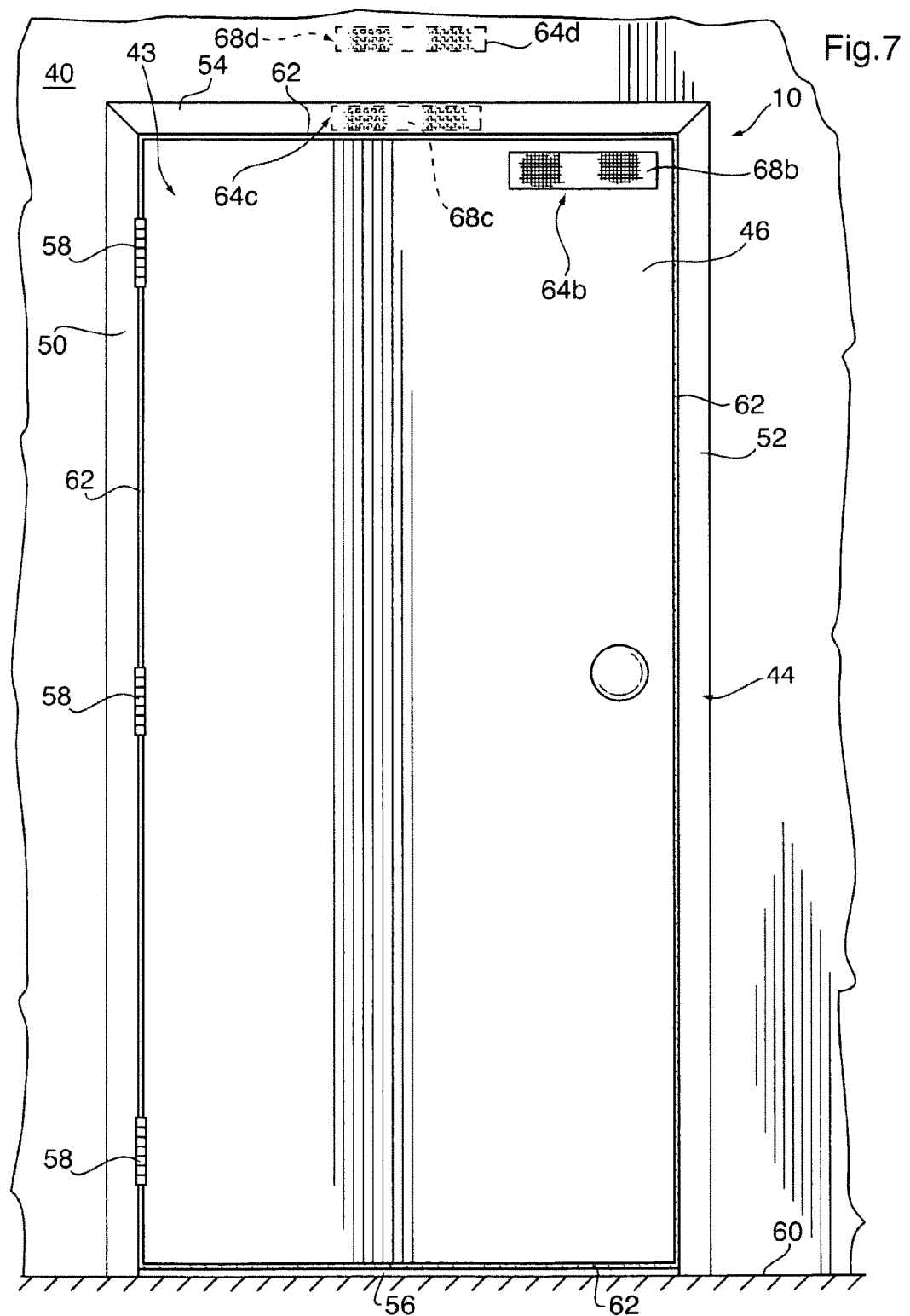
FIG. 7 is an elevation view of a wall-door system, showing the door in its closed position, according to three alternate embodiments of the invention.

In alternate embodiments, air flow openings to allow the appropriate amount of air flow across the wall-door system may be built into other components of such system. Various examples are shown in FIG. 7. As a first example, opening 64b may be designed into door 46 with a removable filter 68b installed in or over opening 64b. As a second example (shown in phantom), door frame 44 may be provided with an opening 64c in which a filter element 68c may be removably installed. As a third example (also shown in phantom), wall 40 itself may be provided with an opening 64d in which removable filter element 68d may be attached. In such embodiments, the filters may be incorporated into a filter holding cartridge which may in turn be readily installed and removed from the openings.

As noted above, if door frame 44 has no sill or threshold, the weatherstripping 62 along the lower edge of door 46 will be of a type which can substantially seal against air flow directly against the threshold region 61 of floor 60 when the door is closed. Referring to FIG. 8, a further alternative embodiment is illustrated which may be used in case it is desired that a gap between the bottom of door 46 and the threshold region 61 of floor 60 be used as an airflow opening 64e. In such a case, there may be no, or only limited sections of, weatherstripping 62 between the bottom of door 46 and floor 60. The gap 64e is covered by filter structure 268, which in the illustrated embodiment extends across the width of door 46; that is, no weatherstripping is used between the bottom of door 46 and floor 60. Filter structure 268 comprises a base portion 270 attached to the bottom of door 46. In the illustrated embodiment, attachment is achieved by screws 272. Mounting slots 274 are provided in base portion 270 to allow for convenient height adjustment. Extending downwardly from base portion 270 is frame portion 276. Preferably, a lower edge of frame portion touches and sealingly engages floor 60. Frame portion 276 defines a frame opening 278 across which filter material 68e substantially extends. Preferably, filter material 68e is removably attached to filter frame 276 and in a sealed manner so as not to allow significant amounts of air to flow between the edges of filter material 68e and frame 276. Suitable adhesive or double-sided adhesive tape (not shown) around the edges of filter material 68e may be used for such purpose.

Referring to FIG. 9, an alternate manner of installing filter 68 is illustrated. In this case, filter 68 is folded whereby to allow adhesive or double-sided tape strips 80 to be attached to a side face 51 of jamb 50 and an edge face 47 of door 46. Although such installation may (because of the thickness and placing of the adhesive or double-sided tape strips 80) restrict the effective size of gap 66, such installation may be considered by some to be more aesthetically pleasing that the installation shown in FIG. 2 and thus preferred.

In an existing building, an occupant of a building with a substantially airtight wall 40 with a substantially airtight door frame 44 and a substantially airtight door 46 may achieve the benefits of the invention by implementing the following method. In one step, install weatherstripping between the edges of door 46 and door frame 44, except in a region along a side edge (preferably a hinge side edge) of door 46 thereby leaving an opening 64 when the door is closed. In another step, attach a filter 68 to door 46 and door frame 44 over opening 64. Preferably, the sides of filter 68 shall be sealingly attached to both door 46 and door frame 44. In another step, if the door frame has no threshold, install weatherstripping between a lower edge of door 46 and floor 60. In another step, if the door frame has no threshold and opening 64 is a gap between a bottom side of door 46 and floor 60, attach a filter structure 268 to door 46. In another step, if necessary, seal the door frame 44 to wall 40. In another step, if necessary, seal any threshold 56 to floor 60.

Although use of the invention has been illustrated in the particular context of a multi-level or high-rise building with multiple office or residential units, it will be appreciated that the invention may be used in any situation where it is desired to filter air moving around the edges of a closed door under the influence of a pressure differential between the two sides of the door.

Although various preferred embodiments of the present invention have been described herein in detail, it will be appreciated by those skilled in the art that variations may be made thereto without departing from the spirit and scope of the invention.

The invention claimed is:

1. An air filter system for a building having a first zone and a second zone, the system comprising:
   a floor having a door threshold region;
   a wall-door system supported by the floor comprising:
   an air flow barrier wall separating the first zone from the second zone;
   an air flow barrier door frame mounted in, and substantially sealed to, the wall, the door frame having two side jambs and a head jamb;
   an air flow barrier door generally sized to fit within the door frame, the door having two side edges and upper and lower edges and being hinged along one side edge to a side jamb of the door frame;
   weatherstripping mounted between the side and upper edges of the door and the door frame and between the lower edge of the door and the threshold region of the floor, except in a pre-determined air flow permitting region, to substantially seal against air flow around the door when the door is closed except through an air flow opening defined by boundaries of the air flow permitting region; and, an air filter mounted to extend substantially across said air flow opening.

2. A filter system as claimed in claim 1 wherein the door frame additionally has a sill mounted and substantially sealed to the floor at the threshold region and wherein any weatherstripping at the lower edge of the door substantially seals against air flow between the lower edge and the sill at any locations where the weatherstripping is present.

3. A filter system as claimed in claim 1 or 2 wherein the air flow permitting region comprises a gap of pre-determined length in the weatherstripping along the hinged side edge of the door.

4. A filter system as claimed in claim 3 wherein the filter comprises a sheet of filter material attached to both the hinged side edge of the door and to the adjacent side jamb of the door frame and substantially covering the gap in the weatherstripping.

5. A filter system as claimed in claim 4 wherein the door is hinged to the door frame by at least two hinges and the gap in the weatherstripping is located between the hinges.

6. A filter system as claimed in claim 5 wherein the filter material is removably attached to the door edge and side jamb by strips of adhesive or adhesive-backed tape along substantially all of its length.

7. A filter system as claimed in claim 6 wherein the filter material is additionally removably attached to the door edge and side jamb at upper and lower ends of the filter material by cross strips of adhesive or adhesive-backed tape.

8. A filter system as claimed in claim 1 wherein the air flow opening is located between the lower edge of the door and the door threshold region.

9. A filter system as claimed in claim 8 wherein the air filter comprises a filter structure with a base portion and a frame portion, the base portion being attached to the lower edge of the door, the frame portion extending downwardly to substantially extend across the air flow opening, the frame portion having a frame opening, and air filter material substantially extending across the frame opening.

10. A filter system as claimed in claim 7 wherein the filter material at its upper and lower ends has attachment tabs wrapped around and removably attached to an edge of the door or door frame.

11. A filter system as claimed in claim 10 wherein the attachment tabs have adhesive or adhesive-backed tape thereon to provide removable attachment.

12. An air filter for filtering air flowing through a gap between a hinge edge of a door and a side jamb of a door frame to which the door is hinged, the filter comprising a sheet of filter material removably and substantially sealably attachable to the hinge edge of the door and to an adjacent portion of the side jamb.

13. An air filter as claimed in claim 12 wherein the filter sheet has strips of adhesive or adhesive-backed tape along substantially all of its length, adaptable to provide the removable and substantially sealable attachment of the filter sheet to the door and door frame.

14. An air filter as claimed in claim 13 wherein the filter sheet has upper and lower edges with cross-strips of adhesive or adhesive-backed tape thereacross, adaptable to provide removable and substantially sealable attachment of said edges to the door and door frame.

15. An air filter as claimed in claim 14 wherein at its upper and lower edges, the filter sheet has attachment tabs with adhesive or adhesive-backed tape thereon, adaptable to be wrapped around and removably attached to an edge of the door or door frame.

16. A method of filtering air in a building having a first zone and a second zone separated by a wall-door system and a pressure differential therebetween, the system having a floor, an air flow barrier wall attached thereto and separating the first zone from the second zone, an air flow barrier door frame mounted in the wall, an air flow barrier door generally sized to fit within the door frame, the door being hinged along one side to a side jamb of the door frame, the method comprising:

installing weatherstripping between the edges of the door and the door frame, except in a region along a hinge side of the door thereby to leave an air flow opening when the door is closed; and, attaching a filter to the door and door frame over the air flow opening and substantially sealing the edges of the filter to the door and door frame.

17. A method as claimed in claim 16 wherein, if the door frame has no threshold, the method further comprises the step of installing weatherstripping between a lower edge of the door and the floor.

18. A method as claimed in claim 16 wherein, if the door frame has a threshold which is not sealed to the floor, the method further comprises the step of sealing the threshold to the floor.

19. A method as claimed in claim 16 wherein, if the door frame is not sealed to the wall, the method further comprises the step of sealing the door frame to the wall.

20. A filter system as claimed in claim 9 wherein the frame portion extends downwardly to substantially seal against the door threshold region.

21. A filter system as claimed in claim 2 wherein the air flow opening is located between the lower edge of the door and the sill.

22. A filter system as claimed in claim 21 wherein the air filter comprises a filter structure with a base portion and a frame portion, the base portion being attached to the lower edge of the door, the frame portion extending downwardly to substantially extend across the air flow opening, the frame portion having a frame opening, and air filter material substantially extending across the frame opening.

23. A filter system as claimed in claim 22 wherein the frame portion extends downwardly to substantially seal against the sill.

24. A filter system as claimed in claims 3, 9, 20 or 22 wherein the filter is removeable.

* * * * *